United States Patent
Motegi et al.

(10) Patent No.: US 6,898,423 B2
(45) Date of Patent: May 24, 2005

(54) GROUP COMMUNICATION SYSTEM FOR MOBILE TERMINALS HAVING REAL TIME COMMUNICATION CAPABILITIES

(75) Inventors: Shinji Motegi, Tokyo (JP); Hiroki Horiuchi, Saitama (JP); Masaru Enomoto, Saitama (JP); Toshikane Oda, Tokyo (JP)

(73) Assignee: DDI Corporation, Tokyo (JP)

( * ) Notice: Subject to any disclaimer, the term of this patent is extended or adjusted under 35 U.S.C. 154(b) by 499 days.

(21) Appl. No.: 09/814,765

(22) Filed: Mar. 23, 2001

(65) Prior Publication Data

US 2001/0027111 A1 Oct. 4, 2001

(30) Foreign Application Priority Data

Mar. 30, 2000 (JP) .......................... 2000-093538
Sep. 12, 2000 (JP) .......................... 2000-276569

(51) Int. Cl.[7] .......................... H04M 3/42; H04B 7/00; H04Q 7/20
(52) U.S. Cl. .................. 455/414.2; 455/518; 455/456.3
(58) Field of Search ........................ 455/414.1, 414.2, 455/414.3, 414.4, 456.1, 456.2, 456.3, 456.4, 516, 518, 519

(56) References Cited

U.S. PATENT DOCUMENTS

| | | | | |
|---|---|---|---|---|
| 5,530,914 A | * | 6/1996 | McPheters | 455/518 |
| 5,758,291 A | * | 5/1998 | Grube et al. | 455/518 |
| 5,850,593 A | * | 12/1998 | Uratani | 455/11.1 |
| 6,091,956 A | * | 7/2000 | Hollenberg | 455/456.5 |
| 6,091,959 A | * | 7/2000 | Souissi et al. | 340/825.49 |

* cited by examiner

Primary Examiner—Nick Corsaro
Assistant Examiner—Edan Orgad
(74) Attorney, Agent, or Firm—Arent Fox PLLC

(57) ABSTRACT

A group communication system includes a plurality of mobile terminals with member-attribute information, and a center component for collecting location information of the mobile terminals. The center component includes a group generation device for generating a group based on a group-area information and a group-attribute information which are specified, and a group member management device for always monitoring joining and leaving of the mobile terminals with the location information and the member-attribute information which correspond to the group-area information and the group-attribute information of the group, respectively.

5 Claims, 4 Drawing Sheets

GROUP COMMUNICATION SYSTEM FOR MOBILE TERMINALS HAVING REAL TIME COMMUNICATION CAPABILITIES

FIELD OF THE INVENTION

The present invention relates to a group communication system for mobile terminals.

DESCRIPTION OF THE RELATED ART

As for group communication, there are two types, a fixed group communication and a changed group communication. Members in the fixed group communication are predetermined, whereas members in the changed group communication can be changed.

In the fixed group radio communication, communication can be executed between mobile terminals previously registered at a center office as members of this group. On the other hand, in the changed group radio communication, communication can be executed between mobile terminals of members which satisfy requirements for this group. The requirements of the group may be, for example, to locate presently in its group-area.

According to a conventional group communication system, it is possible to realize a group communication based on the current location of mobile terminals. However, it is impossible to monitor participation or withdrawal of the mobile terminals to or from the group in response to its attributes or moving states varying in real time.

For example, according to a conventional group communication system, if the mobile terminals consist of portable telephones and a retail store distributes today's bargain sale information to the portable telephones located in a circumference area of the store, such bargain sale information will be distributed even to the portable telephone of user who needs no such information.

According to another conventional group communication system, if the mobile terminals have broadcasting communication functions like an ad hoc network, its all communication contents will be shared by all the mobile terminals located in a group-area. Thus, it is impossible that the mobile terminals communicate each other with respect to a specific subject of the communication contents.

SUMMARY OF THE INVENTION

It is therefore an object of the present invention to provide a group communication system for mobile terminals based on not only location of the mobile terminal but also attributes or moving states of the mobile terminal, varying in real time.

According to the present invention, a group communication system includes a plurality of mobile terminals with member-attribute information, and a center component for collecting location information of the mobile terminals. The center component includes a group generation means for generating a group based on a group-area information and a group-attribute information which are specified, and a group member management means for always monitoring joining and leaving of the mobile terminals with the location information and the member-attribute information which correspond to the group-area information and the group-attribute information of the group, respectively.

Thereby, the system can generates the group based on not only the location of the mobile terminals but also the attribute or the moving state of the mobile terminal changing in real time.

It is preferred that the member-attribute information is service request information, and that the group-attribute information is a service provision information. Thereby, the service information is sent only to the mobile terminals that are located in the particular group-area and need the service of the group.

It is also preferred that the member-attribute information is a user-attribute information, and that the group-attribute information is a subject information for representing a subject of communication contents which characterizes the group. Thereby, the system provides a group communication based on a common subject.

It is preferred that the group-area information and the group-attribute information of the group are specified by a mobile or fixed terminal, or previously specified by the center component. Thereby, the user can generate the group freely.

Preferably, the system further includes a center office and the center office has the center component.

More preferably, any one the mobile terminals has the center component. Thereby, the center office is not needed.

It is preferred that all the mobile terminals have the center components, and that information of the center components are communicated between the mobile terminals. Thereby, the group communication is maintained even if one center component malfunctions.

It is also preferred that the group-area information is a information representing one geographically continuous region, or a plurality of regions two or more geographically distributed discontinuous regions.

It is preferred that the group generation means of the center component generates the group based on a group moving-state information in addition to the group-area information and the group-attribute information, and that the mobile terminal has a measured moving state information in addition to the member-attribute information.

In this case, preferably, the group moving-state information and the moving state information are information representing a destination, a moving speed and/or a classification of the mobile terminal. Also, preferably, if the mobile terminal is mounted on a vehicle, the group moving-state information and the moving state information are information also representing a type of the vehicle, a state of the vehicle and/or a road classification.

It is also preferred that the group member management means of the center component sends a joining request information of the group to a mobile terminal which satisfies requirements of the group, and that the mobile terminal answered to the joining request information is joined the group as a member.

It is further preferred that the center component sends a software component required for service of the group to the mobile terminal when the mobile terminal joins the group.

It is also preferred that when one mobile terminal joins or leaves from the group, the center component notifies that to other mobile terminal of the group, or to all the mobile terminals of the group.

It is preferred that the center component further includes a group search means enabling the mobile terminal to search the group.

Further objects and advantages of the present invention will be apparent from the following description of the preferred embodiments of the invention as illustrated in the accompanying drawings.

BRIEF DESCRIPTION OF THE DRAWINGS

FIGS. 2A and 2B, shows a block diagram schematically illustrating system components in a group communication system as a preferred embodiment according to the present invention;

DESCRIPTION OF THE PREFERRED EMBODIMENTS

Figure 1:
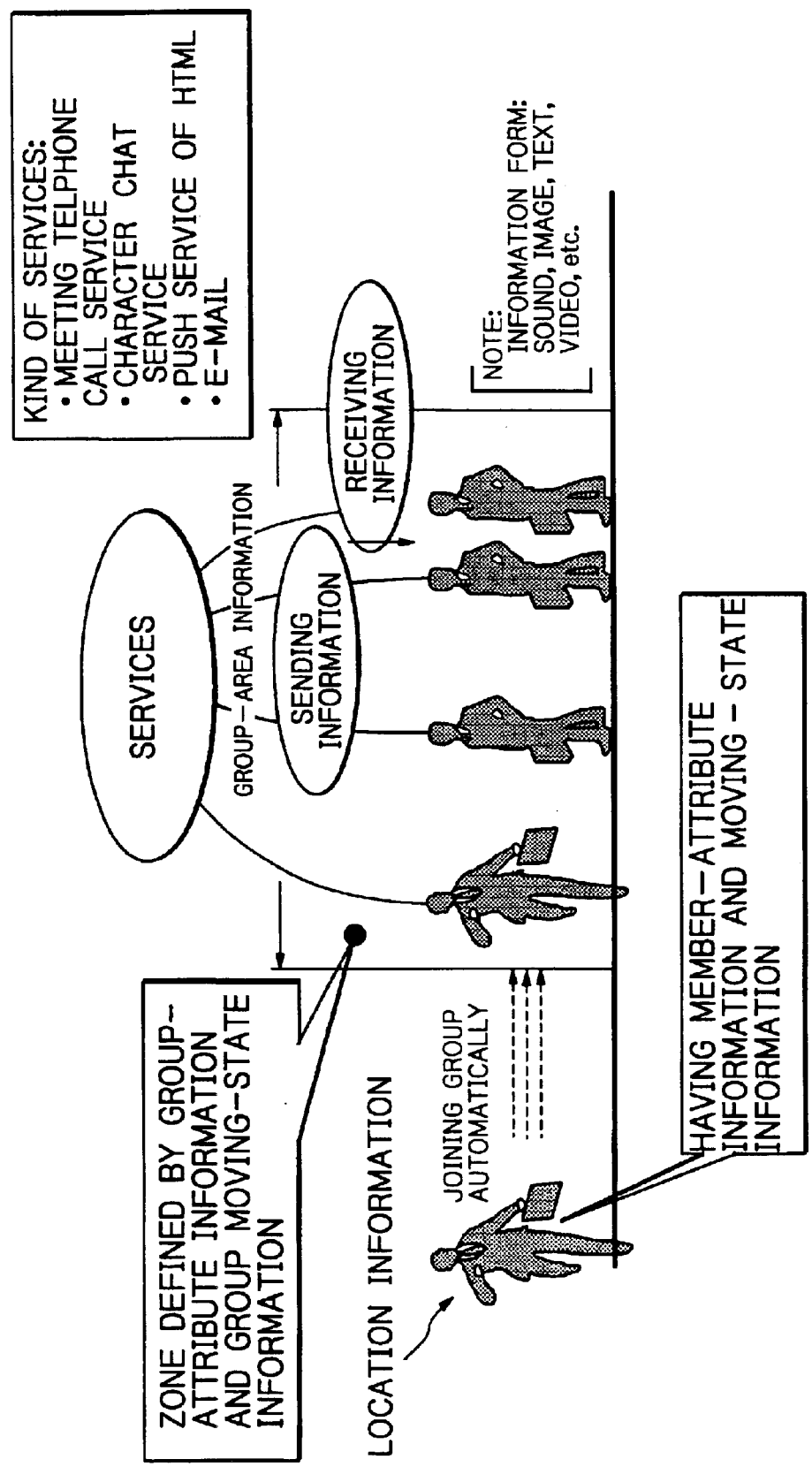
FIG. 1 schematically illustrates a concept of services provided by a group communication system according to the present invention.

FIG. 1 schematically illustrates a concept of services provided by a group communication system according to the present invention.

Each group according to the present invention has, as requirements for participation or joining, a group-area information, a group-attribute information and a group moving-state information. The group-area information indicates an area or region determined for this group. The group-attribute information indicates an attribute of a mobile terminal required for participating to this group, and the group moving-state information indicates a moving state of a mobile terminal required for participating to this group.

On the other hand, each mobile terminal which may participate or join to the group as a member has a location information, a member-attribute information and a moving state information. The location information indicates a current location of the mobile terminal, the member-attribute information indicates an attribute of the mobile terminal, and the moving state information indicates a current moving state of the mobile terminal. Members capable of participating to or joining the group may be changed depending upon time, location, member-attribute and moving states of the mobile terminals.

A first requirement of a mobile terminal for participating to or joining the group as a member is that a current location represented by the location information of the mobile terminal exists within a region represented by the group-area information of the group. The group-area information may be information of a place name, an address, latitude and longitude of the area of the group. For example, the group-area information in a gas station may represent "a predetermined area surrounding the station as a center". This group-area information may be information representing one geographically continuous region, or a plurality of regions two or more geographically distributed discontinuous regions. The location information of the mobile terminal is as aforementioned information of a presently located position of the mobile terminal.

A second requirement of a mobile terminal for participating to or joining in the group as a member is that a member-attribute information of the mobile terminal corresponds to a group-attribute information of the group. If a user of the mobile terminal requests a service, the member-attribute information functions as a service request information and the group-attribute information functions as a service provision information. For example, the gas station may specify "sale of gasoline" as the service provision information, and the mobile terminal may specify "filling of gasoline" as the service request information. Thereby, the service information at the gas station is sent only to the mobile terminals of the user who wants to fill gasoline.

If it is requested to group members by one subject, the member-attribute information is treated as a user-attribute information and the group-attribute information is treated as a subject information representing a subject of communication contents by which a group is characterized. For example, a user may specify "going to the Shonan coast" as the user-attribute information and it is possible to specify as the subject information "going to the Shonan coast". Thereby, a plurality of users driving toward the Shonan coast will constitute a group and can talk each other about traffic information etc.

A third requirement of a mobile terminal for participating to or joining in the group as a member is that a moving state information of the mobile terminal corresponds to a group moving-state information in the group. The group moving-state information and the moving state information may be information of destination, moving speed, a type of vehicle such as car, bus, motorbike or the like, vehicle state such as remaining quantity of fuel or the like, or road classification such as highway name, national way name, general way name or the like. For example, a gas station may specify "remaining fuel is below a predetermined quantity" as the group moving-state information. Thereby, a mobile terminal with the moving state information of "remaining fuel is below predetermined quantity" may be joined in the group as a member. Thus, a service management function unit in the gas station can send commercial information to the mobile terminals of the members.

The above-mentioned group communication is a changed group communication wherein the members may change with progress of time. In such changed group communication, there are two different methods for participating or joining members into the group. In one method, a group management component first broadcasts a participation or joining request information including outline of provided services and a subject of communication contents, and then a mobile terminal which receives this information and answers it will be participated to joined the group. In the other method, a mobile terminal itself searches a group based on a service or subject information and participates or joins in this group. If the location information, the member-attribute information and the moving state information of the mobile terminal do not correspond to the group-area information, the group-attribute information and the request information for moving state condition, respectively, the mobile terminal has to withdraw or leave from the group.

The group communication according to the present invention may be a fixed group communication with predetermined members, not the aforementioned changed group communication. In the fixed group communication, it is necessary to register names of the members in the group. In the fixed group communication, also, the distance between the members may additionally used as the group moving-state information. For example, when the distance between members separates more than predetermined distance, the members can know that the leaving member does not correspond to the group moving-state information.

Figure 2:
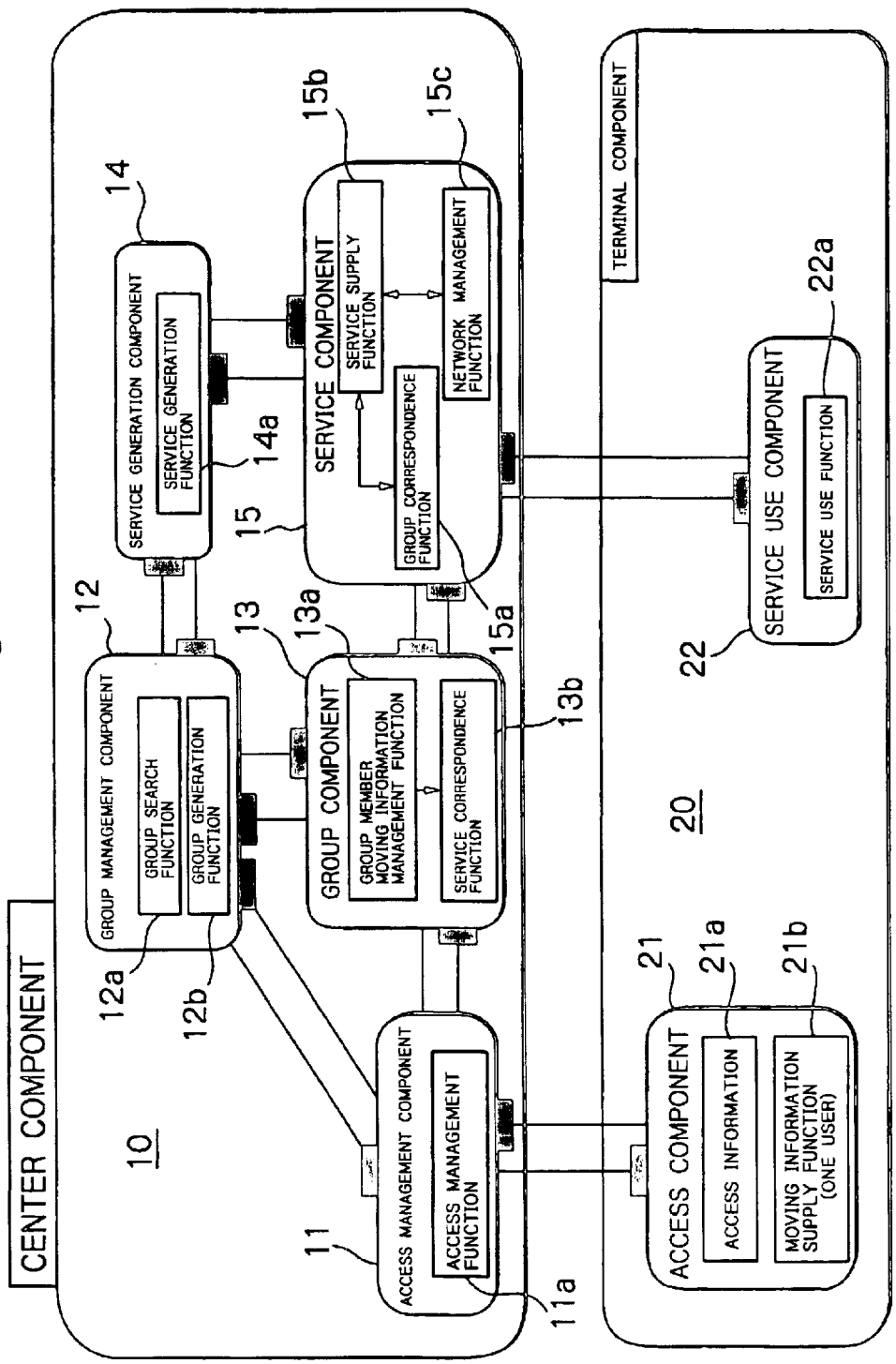
FIG. 2, constituted by combining

FIG. 2 schematically illustrates system components in a group communication system as a preferred embodiment according to the present invention. Each function of the system is implemented as an object component as shown in FIG. 2. Therefore, it is not necessary to implement all components in a center component in one center equipment, but each component may be distributed on a network.

As shown in FIG. 2, the center component 10 has an access management component 11, a group management component 12, a group component 13, a service generation component 14 and a service component 15. On the other hand, a terminal component 20 in a mobile terminal for example has an access component 21 and a service use component 22. These components may be functionally distributed in some places. Also, replicas of the components may be arranged at two or more places to perform load distribution. For example, although the service component 15 is implemented in the center component 10 in the embodiment shown in FIG. 2, by implementing the service component in one mobile terminal, the other mobile terminal can use the same service by accessing the service component in the one mobile terminal.

The access component 21 of the terminal component 20 has an access information 21a and a moving information supply function 21b, and can access to the access management component 11 in the center component 10. The access component 21 sends the access information including the location information, the member-attribute information and the moving state information of the mobile terminal to the access management component 11. The access management component 11 has an access management function 11a for operating as an agent of the user in network side, namely for providing a control function that never depends on a specific service. For example, the control function may be a user authentication and security control such as for example login/logout for the system, a service control such as for example, start, stop, suspend or resume control, a navigation control to service, or a download function of an access management program.

The group management component 12 of the center component 10 has a group generation function 12a to generate or delete a group, and a group search function 12b to search the generated groups.

The group generation function 12a generates a group or a group object, based on group types for communication such as fixed group communication or changed group communication, the group-area information, the group-attribute information and the group moving-state information. These information may be previously specified by the center component 10, or by a user using the mobile terminal or the fixed terminal. Therefore, the user can freely generate, delete or customize a required group. If a group is generated by the group generation function 12b, the group management component 12 provides instructions, to the service generation component 14, for the generation of service corresponding to the group.

The group search function 12a searches a group based on the group-area information, the group-attribute information and the group moving-state information in response to the request from the user using the mobile terminal or the fixed terminal. The result of the search is sent to the mobile terminal 20 through the access management component 11.

The group component 13 for each generated group has a management function of a group-member moving information 13a and a service correspondence function 13b. The group component 13 always monitors and manages participation or joining and withdrawal or leaving of the mobile terminal having the location information, the member-attribute information and the moving state information which correspond with the group-area information, the group-attributed information and the group moving-state information in the group, respectively, and then provide instructions for service control to a group correspondence function 15a of the service component 15. Also, the group component 13 monitors a current location, an update time interval of the location information and a distance between members of the mobile terminal. If a mobile terminal satisfying the requirements presents during monitoring, the group component 13 sends a request for participation or joining to the mobile terminal. If the mobile terminal answers to the participation or joining request, the group member moving information management function 13a will invite the mobile terminal to participate the group as a member, and provide instructions for service control to the service component 15.

The service generation component 14 of the center component 10 has a service generation function 14a for generating a service which will be provided in the group generated by the group management component 12. The service generated at the service generation component 14 is sent to the service component 15 of the center component 10.

The service component 15 has a service supply function 15b for realizing the communication service, and a network management function 15c for controlling networks such as a telephone network or IP network, in addition to the group correspondence function 15a.

The access component 21 of the terminal component 20 sends and receives the message to the access management component 11 of the center component 10, and functions as an agent of the network by the user side. This access component 11 may be implemented in the mobile terminal previously, but when the mobile terminal accesses the center component 10 first, the required access component may be downloaded to the mobile terminal via the network.

The service use component 22 of the terminal component 20 has a service use function 22a for sending and receiving the message to the service component 15 in the center component 10. The service use component 22 functions as an agent of the service by the user side. When the service is started and generated, the service use component 22 required for communicating with the service component 15 is downloaded to the mobile terminal via the network.

The above-mentioned center component 10 and terminal component 20 are functionally distributed at a plurality of places, namely their functional components are distributed in not one place but a plurality of places. In modification, the center component 10 may be load-distributed, namely replicas of each function of the center component 10 may be distributed in a plurality of places to constitute the center component as a whole.

Therefore, it is possible to realize group communication only between mobile terminals if a center component is implemented in any one of the mobile terminals.

Figure 3:
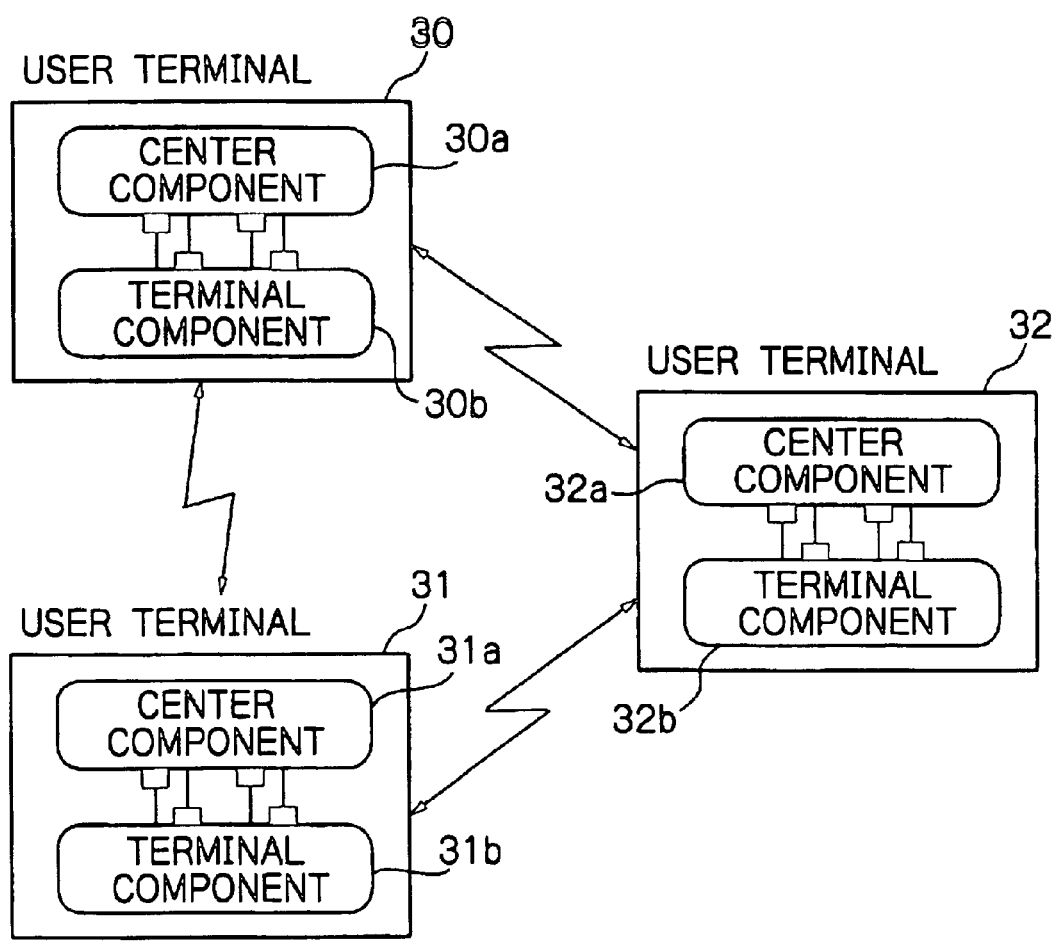
FIG. 3 shows a block diagram schematically illustrating a group communication system as another embodiment according to the present invention.

FIG. 3 schematically illustrates a group communication system as another embodiment according to the present invention. In this embodiment, a center component is implemented in every mobile terminals.

In the aforementioned embodiment, the group is managed by only one group management component 12 and one group component 13. However, in this embodiment shown in FIG. 3, a center component with a group management component and a group component is implemented in every mobile terminals. Namely, user terminals or mobile terminals 30–32 have both center components 30a–32a and terminal components 30b–32b, respectively. Thus, according to this embodiment, since all the mobile terminals 30–32 hold all information of the group to realize consistency, any failure occurred in the group component will not turn into a failure of the whole group and thus a tolerance against malfunctions can be improved.

The constitutions, operations, advantages and modifications of the center component and the terminal component in this embodiment are the same as those in the embodiment shown in FIG. 2.

It is not necessary to implement a service component which is in general implemented in the center component in every mobile terminals. It is possible to implement a service component is only in a center component of one mobile terminal, and to use its service from other mobile terminal.

Figure 4:
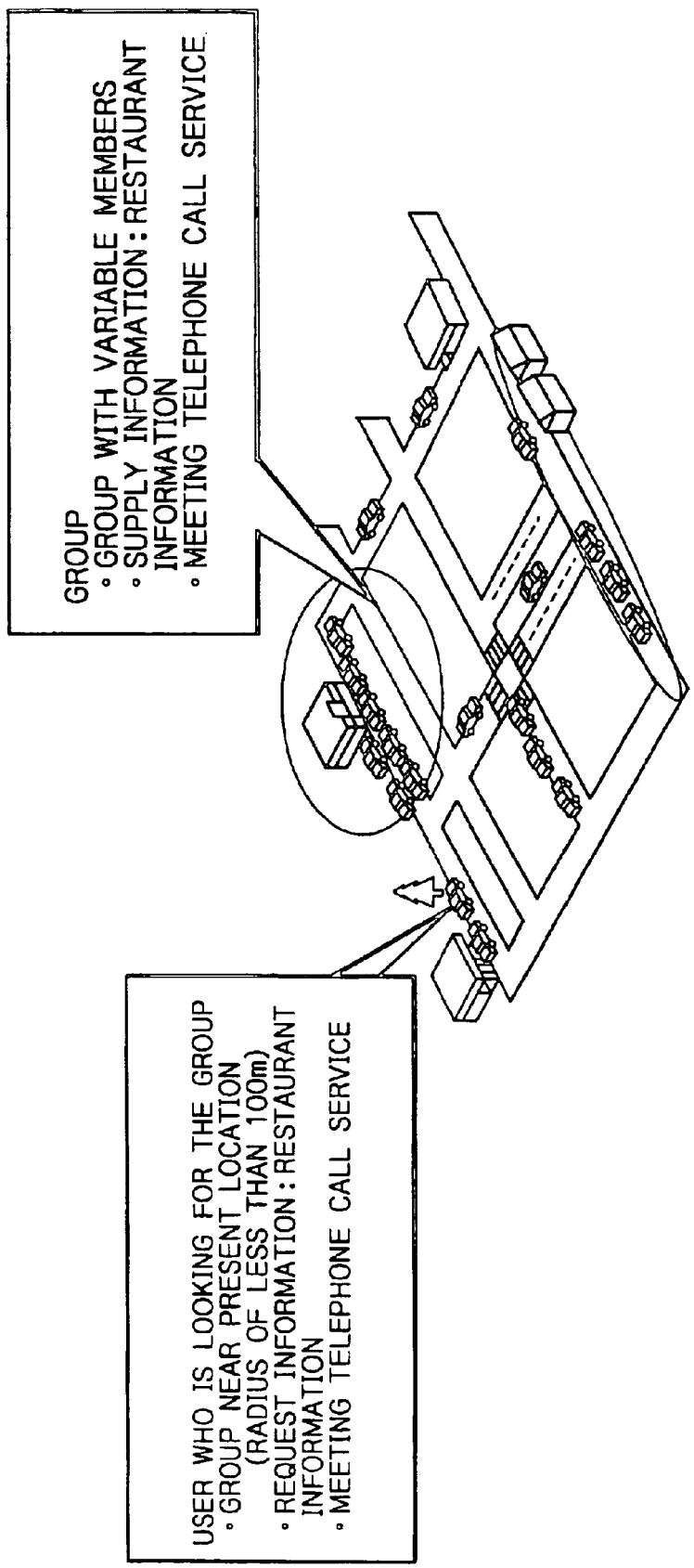
FIG. 4 schematically illustrates examples of a group communication service provided by the system according to the present invention.

FIG. 4 schematically illustrates examples of a group communication service provided by the system according to the present invention.

First, a fixed group communication service will be explained. As shown in the figure, suppose that a plurality of users intend to take a plurality of vehicles with mobile terminals respectively and to move to a destination. In this case, a group specified by the users has fixed members of the mobile terminals in the vehicles. As a requirement for a moving state information, a distance between members is set so that a call of telephones is generated between the members, namely a meeting telephone call starts when the distance between members becomes 100 m or more. According to this service, all the members can know that one member in the group is delayed from other group members due to for example a trouble in the vehicle.

Second, a changed group communication service will be explained. As shown in the figure, suppose that a user takes a vehicle with a mobile terminal and wants a traffic information of a destination during running. In this case, the user requests to a group communication system generation of a certain group with a group-area containing a road such as a national way on which the vehicle of the user is now running. In response to this request, the system generates the group and transmits a message, to users on the same road, for calling to engage in the group for exchanging traffic information. Another user who received the message may anticipate to or join the group, so that the users start communication, in other words generate a call of a telephone between them, to exchange the information.

As aforementioned in detail, the group communication system according to the present invention can constitute a group based on not only the location of the mobile terminals but also the attribute or the moving state of the mobile terminal changing in real time. Also, the user can freely generate a group by using a mobile terminal. Thereby, one mobile terminal can communicate with another mobile terminal with conditions corresponding to desired requirements. That is, the move terminal can send and receive information particularly met to a local area.

Many widely different embodiments of the present invention may be constructed without departing from the spirit and scope of the present invention. It should be understood that the present invention is not limited to the specific embodiments described in the specification, except as defined in the appended claims.

What is claimed is:

1. A group communication system comprising:

a plurality of mobile terminals each with a location information, a user-attribute information, and a measured moving state information; and a center component for collecting said location information of said plurality of mobile terminals, wherein said center component includes a group generation means for generating a group of at least one mobile terminal based on a group-area information, a group-attribute information, and a group moving-state information which are specified by said at least one mobile terminal, and a group member management means for monitoring in real time the joining and leaving of said plurality of mobile terminals with said location information, said member-attribute information, and said measured moving state information which correspond to said group-area information, said group-attribute information, and said group moving-state information of said group, respectively, and wherein said group member management means of said center component sends a joining request information of said group to a mobile terminal which satisfies requirements of said group, said mobile terminal answering to said joining request information joins said group as a member, and when said mobile terminal joins or leaves said group, it notifies other mobile terminals of said group.

2. A system as claimed in claim 1, wherein said group-attribute information is a subject information for representing a subject of communication contents which characterizes said group.

3. A system as claimed in claim 1, wherein said group-area information is information representing one geographically continuous region, or a plurality of geographically distributed discontinuous regions.

4. A system as claimed in claim 1, wherein said group moving-state information and said moving state information are information representing a destination, a moving speed and/or a classification of said mobile terminal.

5. A system as claimed in claim 4, wherein if said mobile terminal is mounted on a vehicle, said group moving-state information and said moving state information are information also representing a type of said vehicle, a state of said vehicle and/or a road classification.

* * * * *